United States Patent [19]

Mullen et al.

[11] Patent Number: 5,372,983

[45] Date of Patent: Dec. 13, 1994

[54] PREPARATION OF CATALYSTS AND SUPPORTS

[75] Inventors: Jeffrey D. Mullen, Pasadena; Joel L. Kitaguchi, Glen Burnie; Darvin R. Moran, Severn, all of Md.

[73] Assignee: W. R. Grace & Co.-Conn., New York, N.Y.

[21] Appl. No.: 66,368

[22] Filed: May 24, 1993

[51] Int. Cl.$^5$ .......................... B01J 21/04; B01J 23/26
[52] U.S. Cl. ..................................... 502/236; 502/239; 502/242; 502/256
[58] Field of Search ............... 502/233, 236, 239, 242, 502/256

[56] References Cited

U.S. PATENT DOCUMENTS

| | | | |
|---|---|---|---|
| 3,887,494 | 6/1975 | Dietz | 252/452 |
| 3,950,316 | 4/1976 | Witt | 260/88.2 R |
| 4,081,407 | 3/1978 | Short et al. | 252/458 |
| 4,119,569 | 10/1978 | Dietz | 252/452 |
| 4,151,122 | 4/1979 | McDaniel et al. | 252/458 |
| 4,152,503 | 5/1979 | Short et al. | 526/106 |
| 4,182,815 | 1/1980 | McDaniel et al. | 526/96 |
| 4,247,421 | 1/1981 | McDaniel et al. | 252/458 |
| 4,299,731 | 11/1981 | McDaniel et al. | 252/451 |
| 4,301,034 | 11/1981 | McDaniel | 502/236 |
| 4,384,086 | 5/1983 | McDaniel et al. | 526/106 |
| 4,436,882 | 3/1984 | Witt | 526/106 |
| 4,436,883 | 3/1984 | Witt | 526/106 |
| 4,547,557 | 10/1985 | McDaniel | 502/236 |
| 4,717,708 | 1/1988 | Cheng et al. | 502/233 |
| 5,073,531 | 12/1991 | Witt | 502/236 |
| 5,162,283 | 11/1992 | Moini | 502/236 |

*Primary Examiner*—Carl F. Dees
*Attorney, Agent, or Firm*—Mary Ann Capria

[57] ABSTRACT

A method for preparing silica, silica-chromium and silica-titanium-chromium polyolefin catalysts and catalyst supports wherein an alcohol-treated hydrogel is heated under partial oxidation conditions to reduce the carbon level to below about one weight percent prior to activation.

10 Claims, No Drawings

PREPARATION OF CATALYSTS AND SUPPORTS

BACKGROUND OF THE INVENTION

The present invention relates to the production of silica-containing catalysts and supports, and more specifically to an improved method for preparing silica, silica-chromium and silica-titanium-chromium catalysts and supports which are derived from alcohol-treated hydrogels.

U.S. Pat. No. 4,436,883 discloses a method for preparing silica-titanium-chromium polymerization catalysts wherein a silica-titanium-chromium hydrogel (tergel) is treated with a $C_5$–$C_6$ alcohol to obtain a xerogel, and the xerogel is heated (calcined) in an inert atmosphere ($N_2$) to remove sorbed alcohol prior to activation in the presence of oxygen (activation).

While the above-noted process produces an active olefin polymerization catalyst, it is found that the use of a high temperature alcohol removal step in the presence of nitrogen frequently results in a catalyst that is unacceptably high in carbon.

Furthermore, attempts to remove excess carbon from Cr III catalyst during the manufacturing process by oxidation (heating in air), may result in a catalyst that contains excessive quantities of toxic Cr VI which is undesirable from the standpoint of material handling and shipping.

SUMMARY OF THE INVENTION

It is therefore an object of the present invention to provide an improved process for manufacturing silica, silica-chromium, and silica-titania-chromium olefin polymerization catalysts and supports to reduce carbon without conversion to Cr VI.

It is a further object to provide a method by which the carbon content of chromium III-containing catalysts may be reduced to a level of below about one weight percent.

It is still a further object to provide a method for preparing low carbon non-activated Cr III catalysts that may be readily packaged, shipped, and handled for use in an olefin polymerization process.

These and still further objects will become readily apparent to one skilled-in-the-art from the following detailed description and specific examples.

DETAILED DESCRIPTION OF THE INVENTION

Broadly, our invention contemplates a catalyst and catalyst support manufacturing process wherein a silica, silica-chromium, silica-titania-chromium hydrogel which has been treated with a $C_5$–$C_6$ alcohol to obtain a xerogel, is subjected to controlled high temperature partial oxidation to remove sorbed alcohol.

More specifically, we have found that low carbon, non-activated silica, silica-chromium, silica-titania-chromium catalysts and catalyst supports may be produced by the following process:

(1) A silica, silica-chromium, silica-titania-chromium hydrogel is prepared by reacting an aqueous mixture of acid (typically $H_2SO_4$), and optionally a titanium salt (typically $TiSO_4$) and chromium salt (typically Cr $(NO_3)_3$), with an aqueous sodium silicate solution to obtain a hydrogel;

(2) The hydrogel is treated with a $C_5$–$C_6$ alcohol (typically 1-hexanol) to obtain a xerogel that contains up to 30 weight percent sorbed alcohol expressed as percent total volatiles ($C_5$–$C_6$ hydrocarbon);

(3) The alcohol-containing xerogel is then subjected to partial oxidation at a temperature of about 450° to 700° C. and preferably 510° to 677° C. in the presence of an atmosphere that contains from about 15 to 30 and preferably 18 to 26 percent air, i.e. about 3 to 6/3.6 to 5.2 volume percent $O_2$ by volume, mixed with an inert gas (typically nitrogen) for a period of 5 to 15 minutes and preferably 8 to 12 minutes, under feed rate conditions wherein from about 0.1 to 0.5 and preferably 0.2 to 0.4 parts by weight air, i.e. about 0.02 to 0.12 and preferably 0.05 to 0.1 parts $O_2$ by weight is mixed with each part by weight hydrocarbon contained in the xerogel.

The non-activated catalyst/catalyst support obtained by the above process contains less than one weight percent carbon, amd preferably below about 0.8 weight percent carbon, and in the event chromium is included, less than about 0.01 weight percent Cr VI.

Prior to use in an olefin polymerization process, the non-activated catalyst/catalyst support may be impregnated with metal salts such as $Cr^{+3}$, and activated by heating in the presence of air at a temperature of about 400° to 800° C. to convert the chromium III component to chromium VI.

The non-activated catalysts/supports of the present invention contain the following range of components:

| Component | Weight percent |
| --- | --- |
| $SiO_2$ | 95 to 100 |
| Ti | 0 to 5 |
| Cr | 0 to 2 | and the following physical properties:

Pore Volume ($N_2$) 2.2 to 2.5 cc/g
Surface Area 420 to 550 m²/g
Density 0.18 to 0.25 g/cc The following is a preferred practice of our invention wherein a silica-titania-chromium olefin polymerization catalyst is prepared:

In step (1) of the above-described process, a $H_2SO_4$/$TiSO_4$/$Cr(NO_3)_3$ mixture typically may comprise the following:

| (a) Ingredient | Weight Percent |
| --- | --- |
| $H_2SO_4$ | 15 to 18 |
| Ti | 0.87 to 1.03 |
| Cr | 0.31 to 0.40 |
| $H_2O$ | balance |

The sodium silicate solution typically contains the following components:

| (b) Component | Weight Percent |
| --- | --- |
| $Na_2O$ | 7.7 to 8.3 |
| $SiO_2$ | 24.5 to 27.5 |
| $H_2O$ | balance |

Reactant mixtures (a) and (b) are reacted in a reaction vessel maintained at a temperature of 10° to 16° C. for a period of 20 to 22 minutes to obtain a precipitated hydrogel that contains about 86 to 91 weight percent $H_2O$ and various amounts of soluble salts (primarily sodium sulfate).

The precipitated hydrogel is recovered by filtration and washed with water, and preferably ammonium nitrate solution, to reduce the sodium content to below about 0.09 percent $Na_2O$.

At step (2) the washed hydrogel is combined with a $C_5$–$C_6$ alcohol, preferably 1-hexanol, in a reaction vessel in amounts ranging from 1.8 to 2.2 parts by weight hydrogel per part by weight alcohol. The mixture is then heated to a temperature of 97° to 99° C. to azeotropically distill the water in the hydrogel and to obtain a xerogel which contains about 25 to 30 weight percent sorbed alcohol expressed as percent total volatiles (% $C_5$–$C_6$ hydrocarbons). The xerogel is dried, ground and sized to a desired particle size range of about 40 to 300 microns.

At step (3) the sized xerogel is heated at a temperature of 510° to 677° C., typically in a controlled atmosphere rotary calciner, in the presence of an atmosphere which contains from about 18 to 26 percent air by volume in admixture with an inert gas such as nitrogen for a period of 5 to 15 minutes to oxidize the sorbed alcohol to $CO_2$ and water and thereby lower the carbon content of the catalyst to below about one weight percent and to avoid any significant oxidation of Cr III to Cr VI.

The catalyst obtained above may be activated by heating in air and used in conventional olefin polymerization processes.

Having described the basic concepts of our invention, the following examples are set forth to illustrate specific embodiments.

EXAMPLE 1

Preparation of Silica-Titania-Chromium Hydrogel

A silica-titania-chromium hydrogel was prepared by reacting a first mixture (dilute acid) containing 526 lbs $H_2SO_4$ (94%), 761 lbs TiO$(SO_4)_3$ (5.5% Ti), 175 lbs $Cr(NO_3)_3$ (9.6% Cr) and 3,036 lbs $H_2O$ with a second mixture of dilute $Na_2OSiO_2$. The dilute $Na_2OSiO_2$ is first prepared by diluting $Na_2OSiO_2$ (consisting of 8.9% $Na_2O$, 29% $SiO_2$ with a specific quantity of 1.395 g/cc) with $H_2O$ to specific gravity of 1.16 g/cc. The silica-titania-chromium hydrogel is produced by mixing 81 gallons of dilute $Na_2OSiO_2$ with 26 gallons of dilute acid at a temperature of 10° to 16° C. for 21 minutes. The resulting precipitated hydrogel was washed with water and sodium nitrate solution to remove sodium sulfate (below 0.09 weight percent $Na_2O$).

EXAMPLE 2

Preparation of Silica-Titania-Chromium Xerogel 2900 lbs of the hydrogel (12% $SiO_2$) prepared in Example 1 was mixed with 1370 lbs of 1-hexanol. The mixture was then heated at 98° C. to remove and azeotropically distill the water from the pores of the hydrogel. The resulting xerogel contained 25 percent 1-hexanol expressed as percent total volatiles ($C_6$ hydrocarbon).

EXAMPLE 3

Removal of 1-hexanol from Silica-Titania-Chromium Xerogel

The xerogel of Example 2 was heated in a rotating calciner maintained at a temperature of 510° to 677° C. The feed rate of the xerogel through the calciner was maintained at 125 lbs/hour while a mixture containing 22 volume percent air (4 SCFM) mixed with nitrogen (14 SCFM) at 18 SCFM total gas flow. The residence time of the xerogel in the calciner was 5 to 15 minutes.

A comparison (prior art) sample was prepared using the same conditions except the inclusion of oxygen was omitted. The calcined xerogel samples were analyzed and found to possess the following chemical/physical properties:

| Chemical (wt. %) | A (Invention) | B (Prior Art) |
| --- | --- | --- |
| $SiO_2$ | 96.3 | 96.3 |
| Ti | 2.52 | 2.48 |
| Cr | 0.97 | 0.98 |
| C | 0.80 | 1.5 |
| Cr III | 0.97 | 0.98 |
| Cr VI | <0.01 | <0.01 |
| Total volatiles | 5.3 | 5.1 |
| $Na_2O$ | 0.04 | 0.06 |
| Physical | | |
| Total pore volume (cc/g $N_2$) | 2.34 | 2.30 |
| Density (g/cc) | 0.21 | 0.21 |
| Surface Area ($m^2$/g $N_2$) | 521 | 511 |

EXAMPLE 4

Evaluation of Catalyst 6,000 lb samples of the calcined xerogels of Example 3 were activated by heating in air at a temperature of 593° C. for 10 minutes.

The above Examples illustrate that valuable olefin polymerization catalysts may be prepared by the process of the present invention.

We claim:

1. In a method for preparing silica-containing catalysts and supports wherein a precipitated silica hydrogel is treated with a $C_5$–$C_6$ alcohol to obtain a xerogel which is calcined to remove alcohol, the improvement comprising:

conducting said calcination at a temperature of 450°–700° C. in a gaseous atmosphere which consists essentially of about 3 to 6 volume percent oxygen with the balance being an inert gas for a period of about 5 to 15 minutes, whereby the carbon content of said xerogel is reduced to below about one weight percent and conversion of Cr III to Cr VI in the xerogel during said calcination is substantially avoided.

2. The method of claim 1 wherein from about 0.02 to 0.12 parts by weight oxygen is included in said atmosphere per part by weight carbon contained in said xerogel.

3. The method of claim 1 wherein the xerogel contains up to about 30 weight percent alcohol prior to said calcination.

4. The method of claim 1 wherein the calcined xerogel contains less than about 0.01 weight percent Cr VI.

5. The method of claim 1 wherein the silica-containing catalyst and support includes a member selected from the group consisting of titania, chromium and mixtures thereof.

6. A method for preparing a silica-titania-chromium olefin polymerization catalyst, said method comprising (a) reacting an acidic aqueous solution of titanium and chromium salts with an aqueous solution of sodium silicate to obtain a silica-titania-chromium hydrogel wherein said chromium comprises Cr III;

(b) treating said hydrogel with a $C_5$–$C_6$ alcohol to obtain a xerogel which contains sorbed alcohol; and (c) calcining said xerogel at a temperature of 450° to 700° C. in an atmosphere which consists essentially of 3 to 6 volume percent oxygen with the balance being an inert gas for a period of 5 to 15 minutes to reduce the carbon content of said xerogel to below one weight percent with conversion of said Cr III to Cr VI being substantially avoided.

7. The method of claim 6 wherein from about 0.02 to 0.12 parts by weight oxygen is included in said atmosphere per part by weight carbon contained in said xerogel.

8. The method of claim 7 wherein said alcohol is 1-hexanol.

9. The method of claim 6 wherein said calcined xerogel contains less than about 0.01 weight percent Cr VI.

10. The method of claim 6 wherein said calcined xerogel is subsequently activated in a separate step by heating said calcined xerogel in air at a temperature of 400° to 800° C.

* * * * *